United States Patent [19]

Kent, Jr.

[11] Patent Number: 5,404,864

[45] Date of Patent: Apr. 11, 1995

[54] OUTDOOR COOKING SYSTEM

[76] Inventor: John E. Kent, Jr., 900 Siskiyou Blvd., No. A-3, Medford, Oreg. 97504

[21] Appl. No.: 164,206

[22] Filed: Dec. 8, 1993

[51] Int. Cl.⁶ .................................................. F24C 1/16
[52] U.S. Cl. ...................... 126/9 B; 126/9 R; 126/25 B; 126/25 R
[58] Field of Search ............ 126/9 R, 9 A, 9 B, 25 B, 126/25 R, 152 B, 215, 216, 38, 50, 43; D7/327, 323, 416, 417, 337

[56] References Cited

U.S. PATENT DOCUMENTS

| | | | |
|---|---|---|---|
| D. 134,572 | 12/1942 | Wokott | D7/337 |
| 179,623 | 7/1876 | Sturdy | 126/50 |
| D. 217,184 | 4/1970 | Davis et al. | D7/417 |
| D. 223,722 | 5/1992 | Stehouwer | D7/417 |
| D. 261,347 | 10/1981 | Lutz | D7/337 |
| D. 271,237 | 11/1983 | Palmer et al. | D7/417 |
| 2,488,014 | 11/1949 | Higman | 126/9 A |
| 2,740,395 | 4/1956 | Goodwin | 126/9 B |
| 2,920,614 | 1/1960 | Phelps . | |
| 3,116,704 | 1/1964 | Byars, Sr. et al . | |
| 3,339,505 | 9/1967 | Bean | 126/25 B |
| 3,499,399 | 3/1970 | Kaufmann | 126/25 B |
| 3,765,397 | 10/1973 | Henderson . | |
| 4,331,125 | 5/1982 | Storandt | 126/25 B |
| 4,436,081 | 3/1984 | Hefling . | |
| 4,481,408 | 11/1984 | Scheufler | 126/9 B X |
| 4,503,835 | 3/1985 | Williams . | |
| 4,624,238 | 11/1986 | Hait | 126/9 B X |
| 4,909,235 | 3/1990 | Boetcker . | |
| 4,909,237 | 3/1990 | Karpinia . | |
| 5,074,279 | 12/1991 | Sainsbury | 126/25 B |

FOREIGN PATENT DOCUMENTS

| | | | |
|---|---|---|---|
| 17067 | of 1910 | United Kingdom | 126/25 B |
| 174476 | 2/1922 | United Kingdom | 126/215 |
| 308104 | 3/1929 | United Kingdom | 126/9 R |

Primary Examiner—Carl D. Price
Attorney, Agent, or Firm—Kolisch Hartwell Dickinson McCormack & Heuser

[57] ABSTRACT

The invention relates to an outdoor cooking system which is portable and collapsible, and which is adaptable for use as a fuel ignitor, as a food warmer and as a cook stove. The system includes an upstanding combustion tube which incorporates an elongate, tubular fire chamber and a plurality of flaps extending perimetrically from at least one of the fire chamber's ends. The flaps are pivotally adjustable so as to accommodate control over the fire chamber's intake and outflow of air. Food is cooked using a conventional cooking utensil which rests across the upper opening of the tube. A radial tray extends about the perimeter of the fire chamber.

5 Claims, 2 Drawing Sheets

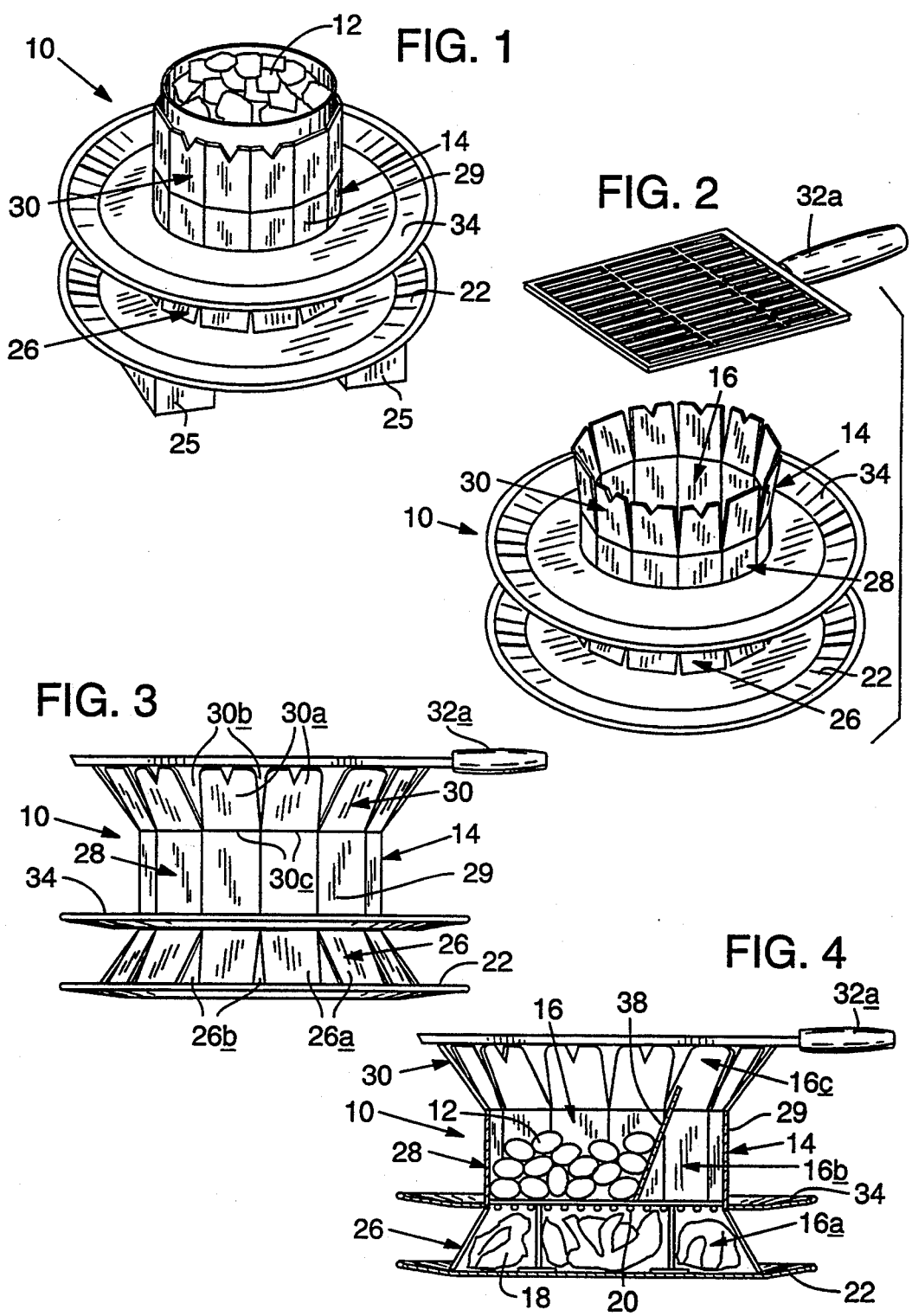

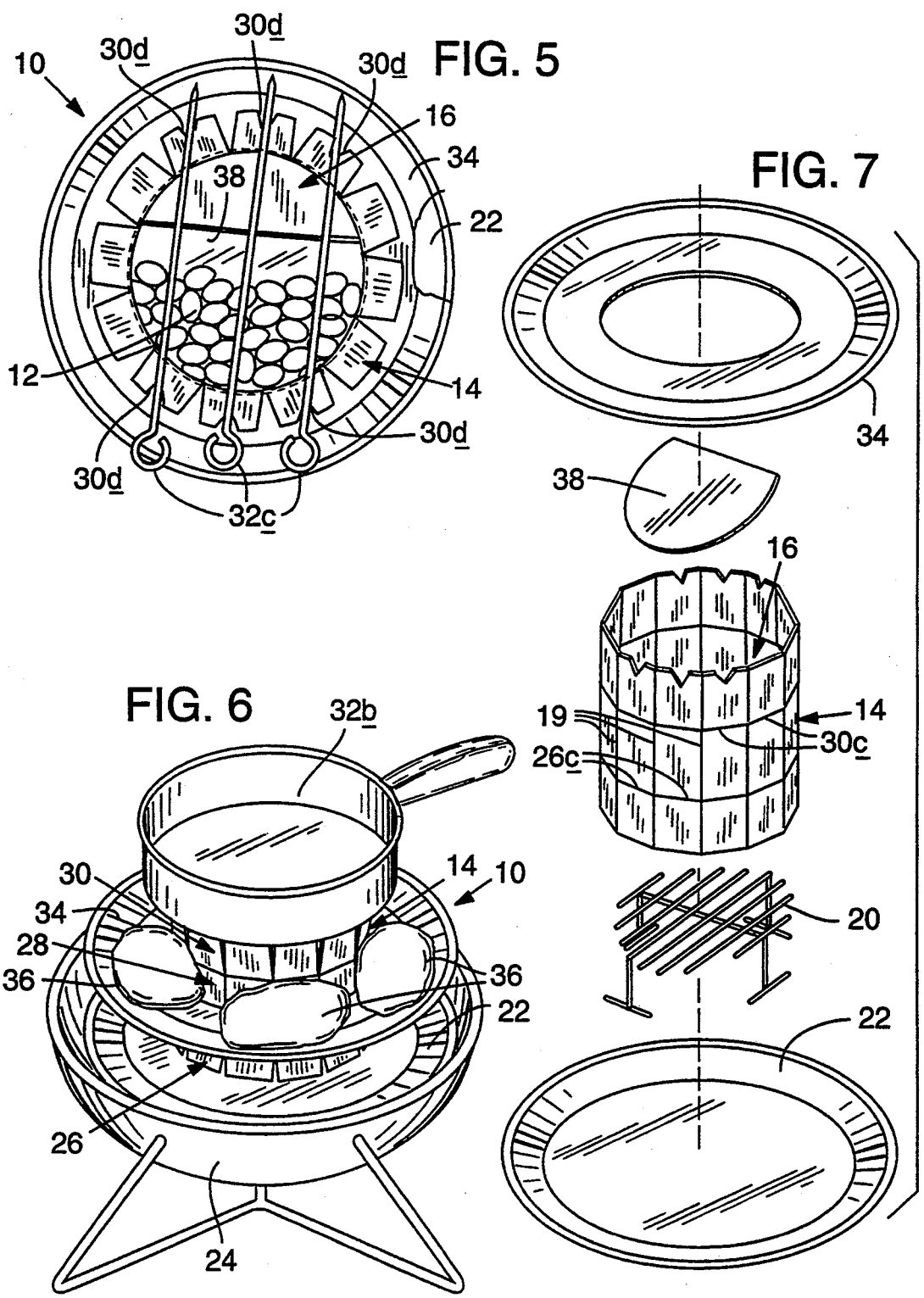

OUTDOOR COOKING SYSTEM

FIELD OF THE INVENTION

The present invention relates generally to open-air cooking, and more particularly, to an outdoor cooking system which may be used as a fuel ignitor, a food warmer and a cook stove, without substantial modifications thereto. The system is portable, is collapsible, and is adaptable for use in various configurations which accommodate various fuel ignition and cooking needs.

BACKGROUND OF THE INVENTION

Solid fuel cook stoves have been known for many years and arc widely used today when camping or otherwise cooking out-of-doors. These stoves provide the user with a certain amount of enjoyment and provide the food with a unique char-broiled taste. Outdoor stoves most often take the form of a kettle grill, an appliance which includes a cupped, upwardly-facing chamber for containing a solid fuel such as charcoal briquettes. The fuel is held beneath a cooking grate, food being placed directly on the grate and cooked after ignition of the fuel below.

Although popular, most outdoor cook stoves have proven to be extremely limited in their usefulness do to the many methods of cooking which are not accommodated thereby. Conventional outdoor cook stoves, for example, are generally intended only for char-broiling meat which is placed directly on the cooking grate. Although utensils such as pots or pans may be placed on the cooking grate, it generally is not possible to direct heat toward the utensil without substantial loss of energy to the surrounding air. This lack of control may result in undesirable heating of the utensil's handle, possibly damaging the utensil and likely making it difficult to grasp.

Known stoves also have demonstrated problems related to fuel ignition, and to maintenance and control of flames once the fuel begins to burn. These problems are closely related to the inadequate ventilation of most outdoor stoves and to the inability of such stoves to adapt to varying environmental conditions such as increased or gusting winds. This lack of ventilation results in less efficient burning of fuel, complicating control of the heat produced, and leading to the contamination of the food by smoke which contains unburned fuel or the like. Such food contamination is exacerbated where a liquid catalyst such as conventional lighter fluid is used to help start the flame.

One solution to fuel ignition difficulties has been to use a separate appliance to facilitate ignition of the fuel. These appliances (referred to herein as fuel ignitors) are generally adapted to accommodate the flow of a large volume of air, such flow being directed through the solid fuel which is to be burned. After the fuel is ignited, it is transferred to a separate appliance wherein food is cooked. Although fuel ignition is facilitated by such appliances, this solution does not address problems related to the maintenance and control of the fire once the fuel is transferred to the cook stove. Also, the use of a separate appliance for igniting fuel detracts from the portability of the stove, an important feature to many of those who use such stoves.

Conventional outdoor stoves also present problems related to heat regulation, it being difficult to accurately define an area in which items may be kept warm. Commonly, cooked items are placed about the perimeter of the cooking grate, the perimeter presumably receiving less heat than the center which often overlies the bulk of the fuel. This arrangement, however, is ineffective inasmuch as most conventional stoves experience periodic flame flare-ups due to grease falling onto the burning fuel. Such flare-ups often lead to burned or charred food.

SUMMARY OF THE INVENTION

The outdoor cooking system of the present invention addresses the problems identified above by providing an appliance which is portable and collapsible, and which is adaptable for use as a fuel ignitor, as a food warmer and as a cook stove. Toward this end, the appliance includes an upstanding combustion tube which incorporates an elongate fire chamber with a plurality of flaps extending perimetrically from at least one of the fire chamber's ends. The flaps are pivotally adjustable, accommodating control over the tube's intake and outflow of air. Solid fuel is held within the fire chamber and burned to provide cooking heat. The fuel is ignited by placing a pre-ignition agent such as paper beneath the fuel and then igniting the pre-ignition agent with the flames being directed toward the solid fuel. Food is cooked using a cooking utensil which rests across the upper opening of the tube. An annular tray extends about the perimeter of the fire chamber, such tray being useful either as an alternative cooking surface or as a warmer for already cooked food.

BRIEF DESCRIPTION OF THE DRAWINGS

FIG. 1 is an isometric view of a preferred embodiment of the proposed cooking system, such system being adapted for use as a fuel ignitor and containing a charge of charcoal briquettes.

FIG. 2 is an isometric view of the preferred embodiment system adapted for use as a cooking stove, the system being shown in connection with a removable hibachi grate on which food is to be cooked.

FIG. 3 is a side elevation of the cooking system depicted in FIG. 2.

FIG. 4 is a sectional side view which shows the cooking system of FIG. 2.

FIG. 5 is a top view of the invented cooking system, such system being adapted to support plural skewers for use in cooking kabobs.

FIG. 6 illustrates the preferred embodiment cooking system used in connection with a conventional frying pan, the system being seated in a conventional kettle grill.

FIG. 7 is an exploded isometric view showing the preferred embodiment cooking system in its component parts.

DETAILED DESCRIPTION OF THE PREFERRED EMBODIMENT

Turning now to the drawings, a preferred embodiment of the invented cooking system has been depicted, the system being indicated generally at 10. In accordance with my teachings, the system is constructed to operate both as a fuel ignitor (FIG. 1) and as an outdoor cook stove (FIGS. 2–6), and is particularly well suited for use in connection with a solid fuel such as charcoal briquettes 12. The system does not require the transfer of hot coals from one appliance to another, and obviates the need to carry multiple appliances to a remote camp site. As indicated in FIG. 7, the system is readily collapsible, making for an appliance which may be transported in a small sack or box (not shown). This is in striking contrast to conventional fuel ignitors and kettle grills which are awkward to carry and are seldom collapsible without a set of tools and a significant amount of work.

Pursuant to the present invention, cooking system 10 is provided with an elongate combustion tube 14, such tube defining a double-open-ended interior 16. As best shown in FIG. 4, interior 16 is divisible into plural regions 16a, 16b, 16c, each such region being formed to facilitate a particular aspect of solid fuel combustion. Region 16a, for example, serves as a pre-ignition chamber, such region being capable of containing a suitable pre-ignition agent 18 such as paper, cardboard or other kindling. Region 16b serves as a fire chamber in which solid fuel 12 is burned. Resultant heat is directed out of the tube through region 16c which serves as conduit between the fire chamber and an utensil on which food is to be cooked.

In its preferred form, the tube is made of aluminum, a lightweight material capable of withstanding the heat which results from the burning of briquettes 12. The tube is made collapsible by using a thin gauge aluminum which is foldable along predetermined fold paths 19 (FIG. 7). It will be appreciated, however, that tube 14 similarly could be made collapsible by various other hinge arrangements which are well known in the art. The preferred tube is thus configurable such that it may be closed for storage as a generally flat piece.

Unlike conventional outdoor cooking stoves, the invented system is designed to provide adequate ventilation to the fuel both during ignition and during burning of the ignited fuel. Toward this end, the tube is fashioned to stand upright, providing a flue through which air and heat may flow. The pre-ignition agent is placed within the pre-ignition chamber, and the solid fuel is placed above the pre-ignition agent on a grate 20 (FIG. 4). Upon ignition of the pre-ignition agent, heat and flames are directed through the solid fuel, resulting in ignition of such fuel. Flow is controlled by manipulation of the tube, which is adaptable to limit both the intake and outflow of air as will be described below. In its preferred arrangement, the tube is configured with an hourglass profile, creating a flue which exhibits a venturi-like effect.

As indicated, the tube generally stands on a planar base 22, such base being formed of a fire-resistant material similar to that which forms the tube. The base serves the dual purpose of supporting the tube and collecting ashes, thus taking the form of an ash tray. In the preferred embodiment, the tube has a broad, generally elliptical cross-section, such shape having been found to provide the tube with stable footing for placement on the base. This is particularly important where hot coals are contained within the tube spilled coals creating a potential for fire or injury. The entire system may be raised by placement of the base in a conventional kettle grill 24 (as indicated in FIG. 5) or by placement of the base on fire-resistant blocks 25 (as indicated in FIG. 1).

Corresponding to the three regions identified above, the tube may be considered to consist of three sections (26, 28, 30), each section being configured to facilitate operation of a particular combustion task. The lowermost section 26 acts as an air intake section, the central section 28 acts as a fuel containment section and the uppermost section 30 acts as an air outflow section. The intake and outflow sections are adjustable, such sections being configurable to effect control over the flow of heat and air. The fuel containment region, which is also referred to as a fire chamber, includes an elongate tubular surface structure 29. The fire chamber surface structure is capable of containing both the solid fuel and any flames which result when the fuel is burned. Although each region is considered separately herein, it will be appreciated that the preferred embodiment tube is a unitary piece.

Referring first to intake section 26, it will be noted that such section includes a plurality adjustable intake flaps 26a. These flaps extend from the perimeter of the fire chamber's lower end, the flaps being positioned closely adjacent one another to effectively extend such perimeter downwardly and/or outwardly from surface structure 29. Each flap is pivotable about its interface with the fire chamber. As indicated in FIG. 3, pivot of the flaps results in opening or closing of ventilation passages 26b through which air enters the tube. Because the tube stands upright, the tube's lower opening is generally covered by the base plate, leaving passages 26b as the only openings at the lower end of the tube. It is found in practice that adjustability of the air intake passages allows the user to adapt the system for use in various undesirable weather conditions such as under conditions of high or gusting winds. Flap pivotability is achieved by provision of a suitable hinge arrangement such as predefined fold paths 26c (FIG. 7).

The air outflow section 30 includes a plurality of adjustable outflow flaps 30a, such flaps being similar in both form and operation to the tube's intake flaps 26a. The principal difference between the intake and outflow flaps is simply that the outflow flaps extend from the fire chamber's upper rather than lower end. Each outflow flap is pivotable about its interface with the fire chamber's upper perimeter, such pivotability being illustrated by a comparing the position of the outflow flaps in FIGS. 1 through 3. As indicated, the flaps are foldable along predefined fold lines 30c. Pivot results in opening or closing of passages 30b which serve to vent the tube. These passages are particularly important where cooking utensils such as pots and pans are used, such utensils tending to cover the upper opening in the tube. The outflow flaps also serve to broaden or narrow the tube's upper opening, accommodating receipt of various size cooking utensils without unnecessary loss of heat to the surrounding air. The tube's uppermost end thus provides a stable base for a cooking utensil such as hibachi grate 32a (FIGS. 2-4) or frying pan 32b (FIG. 6). The flaps may also be adapted, as shown in FIG. 5, to provide seats for skewers 32c used in making kabobs. Toward this end, the flaps define notches 30d which receive the skewers therein.

In accordance with my teachings, system 10 further includes an annular tray 34 which extends about the perimeter of the fire chamber 28. The tray is placed over the tube at the time of assembly, and then supported on outwardly folded flaps 30a. It will be appreciated, however, that the such tray may be supported by other suitable securement mechanism. The tray is useful in keeping food warm, being closely adjacent the burning solid fuel, but may also be used to cook foods which would be impossible to cook on a conventional grill. Tray 34 may thus serve as an alternative cooking surface as illustrated by the cooking of potatoes 36 on the tray in FIG. 6.

The system is made further adjustable by fire chamber separator 38, such separator being useful in dividing the fire chamber into smaller sub-chambers. The separator is supported in an upright position within the tube, support generally being provided by engagement with the tube walls. In this manner, it is possible to use a smaller portion of the fire chamber to cook, reducing the quantity of fuel consumed. The use of such a separator is illustrated in FIG. 4. By virtue of its lower arcuate edge, the separator may be used to divide the chamber into cooking and warming subchambers, the hot coals being kept on one side of the separator, but heat some being allowed to flow in both sides.

Although a preferred embodiment of the invention has been described, it will be appreciated by those skilled in the art that various modifications may be made without departing from the invention as claimed.

I claim:

1. A cooking system for use with a solid fuel, the system comprising:

an elongate combustion tube configured for upstanding orientation such that air flows substantially upwardly therethrough, said tube including an air intake section defined by a plurality of adjustable intake flaps which provide air intake passages therebetween, an elongate fuel containment section defined by a continuous surface structure having first and second ends, and an outflow section defined by a plurality of adjustable outflow flaps which provide air outflow passages therebetween; and an annular tray extending perimetrically about said fire chamber;

said intake flaps extending perimetrically from said first end of said fuel containment section to provide a combustion tube footprint and said outflow flaps extending perimetrically from said second end of said fuel containment section to support a cooking utensil on an upper perimeter defined by said outflow flaps.

2. A cooking system for use in igniting and burning a solid fuel to cook food held by a cooking utensil, the system comprising:

an elongate combustion tube configured for upstanding orientation, said tube including an elongate fuel containment section having a continuous surface structure which defines a fire chamber capable of containing ignited solid fuel, an air intake section having a plurality of pivotally adjustable intake flaps which extend downwardly from a first end of said fuel containment section selectively to define variable-size air intake passages therebetween, and an outflow section having a plurality of pivotally adjustable outflow flaps which extend upwardly from a second end of said fuel containment section to support the cooking utensil and selectively to define variable-size air outflow passages therebetween; and a substantially horizontal annular tray extending perimetrically from said fuel containment section approximately at an interface between said fire chamber and said intake flaps to define a secondary cooking surface for the system.

3. The cooking system of claim 2, wherein said system is collapsible.

4. The cooking system of claim 2 which further comprises a substantially horizontal ash collection tray on which said tube stands.

5. The cooking system of claim 2 which further comprises an internal separator adaptable selectively to divide said fire chamber into multiple subchambers.

* * * * *